US011115370B2

(12) United States Patent
Bastide et al.

(10) Patent No.: US 11,115,370 B2
(45) Date of Patent: Sep. 7, 2021

(54) FOCUSED KERNELS FOR ONLINE BASED MESSAGING

(71) Applicant: International Business Machines Corporation, Armonk, NY (US)

(72) Inventors: Paul R. Bastide, Ashland, MA (US); Robert E. Loredo, North Miami Beach, FL (US); Fang Lu, Billerica, MA (US); Matthew E. Broomhall, Goffstown, NH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/409,452

(22) Filed: May 10, 2019

(65) Prior Publication Data

US 2020/0358737 A1 Nov. 12, 2020

(51) Int. Cl.
*H04L 12/58* (2006.01)
*H04L 29/08* (2006.01)
*G06Q 50/00* (2012.01)

(52) U.S. Cl.
CPC ............. *H04L 51/32* (2013.01); *G06Q 50/01* (2013.01); *H04L 67/1046* (2013.01); *H04L 67/26* (2013.01)

(58) Field of Classification Search
CPC ...... H04L 51/32; H04N 9/8205; G06Q 10/00; G06F 16/48
USPC ........................................................ 709/206
See application file for complete search history.

(56) References Cited

U.S. PATENT DOCUMENTS

| | | | | |
|---|---|---|---|---|
| 6,324,568 B1 * | 11/2001 | Diec | ....................... | H04L 67/02 709/203 |
| 9,043,329 B1 | 5/2015 | Patton et al. | | |
| 2005/0149621 A1 | 7/2005 | Kirkland et al. | | |
| 2007/0299978 A1 * | 12/2007 | Neumann | ............. | G06F 16/957 709/229 |
| 2010/0131328 A1 * | 5/2010 | DeLugas | ................ | G06Q 10/00 705/80 |
| 2012/0030368 A1 * | 2/2012 | John | ..................... | G06F 16/951 709/231 |
| 2012/0323930 A1 * | 12/2012 | Kennberg | ............. | H04L 63/101 707/748 |

(Continued)

OTHER PUBLICATIONS

Merriam-Webster, "specialize", 2020 (Year: 2020).*

(Continued)

*Primary Examiner* — Ondrej C Vostal
(74) *Attorney, Agent, or Firm* — Heather M. Johnston (57) ABSTRACT

A processor may analyze one or more social media messages from one or more social media platforms. Each of the one or more social media messages may include a generalized metadata tag and the one or more social media messages may be categorized as a generalized group. The processor may determine, from the generalized group, that the one or more social media messages exceeds a generalized threshold. The processor may generate a first specialized metadata tag for a first set of social media messages included in the one or more social media messages. The processor may partition, based on the first specialized metadata tag, the first set of the one or more social media messages into a specialized group within the generalized group. The processor may direct one or more users associated with the first set of social media messages to the specialized group.

17 Claims, 6 Drawing Sheets

(56) References Cited

U.S. PATENT DOCUMENTS

| | | | |
|---|---|---|---|
| 2013/0177296 A1* | 7/2013 | Geisner | H04N 9/8205 |
| | | | 386/241 |
| 2014/0365570 A1* | 12/2014 | Peters | G06Q 10/107 |
| | | | 709/204 |
| 2015/0095355 A1 | 4/2015 | Patton | |
| 2015/0281163 A1* | 10/2015 | Bastide | G06Q 10/10 |
| | | | 709/206 |
| 2015/0286790 A1* | 10/2015 | Ahmad | G06F 19/00 |
| | | | 705/2 |
| 2015/0371283 A1* | 12/2015 | Chevrier | G06Q 30/0269 |
| | | | 705/14.66 |
| 2016/0021053 A1 | 1/2016 | Bastide et al. | |
| 2016/0358096 A1* | 12/2016 | Bannur | G06F 16/9535 |
| 2017/0078237 A1* | 3/2017 | Roy | H04L 67/22 |
| 2017/0091827 A1* | 3/2017 | Patel | G06F 16/48 |
| 2017/0118161 A1* | 4/2017 | Ravishankar | H04L 51/18 |
| 2017/0201482 A1* | 7/2017 | Ravishankar | H04L 51/32 |
| 2017/0201774 A1* | 7/2017 | Lindsay | H04N 21/44204 |
| 2017/0344224 A1* | 11/2017 | Kay | G06F 40/205 |
| 2018/0060439 A1* | 3/2018 | Kula | G06F 16/24575 |
| 2018/0097757 A1* | 4/2018 | Nguyen | H04W 4/12 |
| 2018/0103003 A1 | 4/2018 | Bastide et al. | |
| 2018/0129535 A1* | 5/2018 | Carted | G06F 9/5083 |
| 2018/0191651 A1* | 7/2018 | Goldberg | H04L 51/08 |
| 2018/0227260 A1 | 8/2018 | Anders et al. | |
| 2018/0309707 A1 | 10/2018 | Bastide et al. | |
| 2018/0324128 A1 | 11/2018 | Bastide et al. | |
| 2019/0213322 A1* | 7/2019 | Dehon | G06F 21/57 |

OTHER PUBLICATIONS

Cruz, R., "Social Media Capture, Archiving, and Compliance Solutions," Social Media Archiving—Capture Social Media Content—Smarsh, https://www.actiance.com/solutions/social-media-compliance/, printed Apr. 9, 2019, 6 pgs.

Gnip, "Gnip APIs," http://support.gnip.com/apis/, printed Apr. 9, 2019, 4 pgs.

Gusti et al., "Generating of Automatic Disaster Hashtag Based on OCHA Standard," The 2nd International Conference on Informatics for Development (ICID) 2018, Yogyakarta, Indonesia, Nov. 27, 2018, pp. C1-4-C1-8.

IBM, "Natural Language Classifier," Watson Natural Language Classifier, https://www.ibm.com/watson/services/natural-language-classifier/, printed Apr. 9, 2019, 9 pgs.

Mell et al., "The NIST Definition of Cloud Computing," Recommendations of the National Institute of Standards and Technology, U.S. Department of Commerce, Special Publication 800-145, Sep. 2011, 7 pgs.

Zhang, R. "Method and System for Creating a Dynamic Hashtag." IP.com Disclosure No. IPCOM000233545D, Publication Date: Dec. 12, 2013, 3 pgs.

* cited by examiner

Social Media Feed
202

A: "Detour at Main Street. #construction" - tag (Lat. 1, Long. 1)
B: "A – Thanks for the heads up. #construction" - tag (Lat. 1, Long. 1)

C: "Bridge closed at Main Street. #construction." - tag (Lat. 5, Long. 5)

West of Main Street Construction Feed
204

A: "Detour at Main Street. #WESTconstruction" - tag (Lat. 1, Long. 1)
B: "A – Thanks for the heads up. #WESTconstruction" - tag (Lat. 1, Long. 1)
D: "Which entrance should I use to get to work." - tag (Lat. 2, Long. 2)

East of Main Street Construction Feed
206

C: "Bridge closed at Main Street. #EASTconstruction." - tag (Lat. 5, Long. 5)
E: "Parkway Drive entrance to Main Street closed." - tag (Lat. 5., Long. 5)

FOCUSED KERNELS FOR ONLINE BASED MESSAGING

BACKGROUND

The present disclosure relates generally to the field of social media collaboration, and more specifically to automatically streamlining the most relevant social media news to a specific user.

It is becoming increasingly more common to have multiple instances of similar events being broadcast over social media to a user and, oftentimes, the user is unsure of which events are most likely to affect their day.

SUMMARY

Embodiments of the present disclosure include a method, computer program product, and system for automatically streamlining the most relevant social media news to a specific user. A processor may analyze one or more social media messages from one or more social media platforms. Each of the one or more social media messages may include a generalized metadata tag and the one or more social media messages may be categorized as a generalized group. The processor may determine, from the generalized group, that the one or more social media messages exceeds a generalized threshold. The processor may generate a first specialized metadata tag for a first set of social media messages included in the one or more social media messages. The processor may partition, based on the first specialized metadata tag, the first set of the one or more social media messages into a specialized group within the generalized group. The processor may direct one or more users associated with the first set of social media messages to the specialized group.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of social media collaboration, and more specifically to automatically streamlining the most relevant social media news to a specific user. While the present disclosure is not necessarily limited to such applications, various aspects of the disclosure may be appreciated through a discussion of various examples using this context.

With today's influx of social media use and social media users, it is becoming harder to join an organized and useful social media conversation. As such, there is an increasing need to focus social media conversations on the kernel of messages that matter to a specific user.

Accordingly, in some embodiments, a processor may analyze one or more social media messages from one or more social media platforms. Each of the one or more social media messages may include a generalized metadata tag, and the one or more social media messages may be categorized as a generalized group. The processor may determine, from the generalized group, that the one or more social media messages exceeds a generalized threshold. The processor may generate a first specialized metadata tag for a first set of social media messages included in the one or more social media messages. The processor may partition, based on the first specialized metadata tag, the first set of the one or more social media messages into a specialized group within the generalized group. The processor may direct one or more users associated with the first set of social media messages to the specialized group.

For example, Alice, Bob, Charlie, and Denise may all be members of the same social media platform, and Alice may post to the social media platform: "Water main burst at $53^{rd}$ #flooding" (with "#flooding" acting as a generalized metadata tag that can either be automatically generated and assigned by the social media platform, or generated and assigned by the user). Bob may post to the social media platform: "Flooding at friend's place #flooding." Lastly, Charlie may post to the social media platform: "Bob, sorry for your friend #flooding."

The social media platform may determine that two hundred posts with "#flooding" exceeds a generalized threshold (e.g., the threshold may be determined by when the processor identifies/determines that a generalized group has gotten too large for a common user to easily scan the information in the generalized group) and inspect the posts for any common subthemes (it is noted that any number may be used as the threshold, but for instances of this example, two hundred posts, is the threshold limit). The social media platform may determine that Alice and Bob's posts are related in that they both talk about flooding at some place (e.g., $53^{rd}$ street and Bob's friend's place), whereas, Charlie's post does not relate to any place and is a generic response to a post. It is noted that, in some embodiments, the social media platform may relate Charlie's post to the flooding as Charlie directly responds to Bob's post and it is unlikely that Charlie was just aimlessly talking about flooding. However, for ease of understanding, the present example proceeds with Charlie's post not being related to the specific flooding as he is not in the general area of the flooding or providing any useful information to a conversation about the flooding.

Furthering the example now, the social media platform, in response to the determination, may generate a new tag: "#53rdStreetFlood" (e.g., the first specialized metadata tag) for Alice's and Bob's posts. In some embodiments, the social media platform may group Alice and Bob's posts together. Now, when Denise accesses her social media feed in the vicinity of $53^{rd}$ street, she sees Alice's and Bob's posts in regard to the #53rdStreetFlood before seeing Charlie's post. In some embodiments, Denise may never be shown or directed to Charlie's post as it is still assigned the generalized "#flooding" tag and/or because the social media platform determined that Charlie's post was irrelevant to Denise (as the post does not speak to the actually flooding on $53^{rd}$ street).

In some embodiments, the first specialized metadata tag may be associated with a geographical location. In some embodiments, the processor may replace the generalized metadata tag of the social media messages in the first set of social media messages with the first specialized metadata tag. The processor may display the first set of social media messages to the one or more users in the geographical location.

For example, Frances and Gilbert may each post a social media message that includes the generalized metadata tag "#SportsHighlight." However, Frances may live in Portland and Gilbert may live in Phoenix and the two are posting about different sporting highlights. In some embodiments, each of the mobile devices used by Frances and Gilbert to post their respective social media messages may have geo-stamped (e.g., using GPS, etc.) Frances' and Gilbert's location to their messages. The social media platform where the social media message was posted may then generate separate specialized metadata tags for both Frances' and Gilbert's messages in order to distinguish the two sporting highlights.

Frances' message may now be replaced with "#PortlandSportsHighlight," and Gilbert's message may now be replaced with "#PhoenixSportsHighlight." Now, any new user that accesses the social media platform while in the Portland area will be displayed Frances' message, and any new user in the Phoenix area will be displayed Gilbert's message. In some embodiments, the specialized metadata tags may not replace the generalized metadata tag, but may be in addition to the generalized metadata tag (e.g., the messages/posts include both tags). In some embodiments, the specialized metadata tags may be even more specific than what was exemplified. For instance, the geo-stamp on Frances' post may indicate that she is at Portland's basketball center and the specialized metadata tag may be "#PortlandBasketballHighlight," etc.

In some embodiments, the processor may identify that a retention threshold of new social media messages including the generalized metadata tag has not been met within a specified time. The processor may merge (or determine to merge) the specialized group back into the generalized group. For example, it may be a sport's first round tournament weekend and multiple user's may be posting to a social media website using the hashtag: "#1." The social media website (or a server hosting the social media website) may generate, based on the users' locations, one or more specialized groups for each of the posts with the hashtag.

For instance, one specialized group may be for user's who posted "#1" while in Washington and each of the posts may now have the specialized hashtag: "Washington#1." The social media website may then identify that for 4 hours no other users have posted any messages with "#1" and determine that the frenzy to differentiate "#1s" is no longer needed and may merge all of the specialized groups back into the generalize group with the generalized hashtag of "#1." It is noted that generating specialized groups help one or more user's more quickly and accurately find information and/or forums that they wish to be a part of (e.g., a Washington fan to be in a group of other Washington fans instead of seeing multiple other posts that include different types of fans). It is also noted that merging the specialized groups back into the generalized group saves processing/computing power for the process/system/social media site/etc. that is hosting the users' content, as no more partitions (e.g., virtual machines, etc.) are needed to segment the groups and all resources can be used for the processing of one group.

In some embodiments, the processor generates a second specialized metadata tag for a second set of social media messages included in the one or more social media messages. The second specialized metadata tag may be associated with a second geographical location. The processor may partition, based on the second specialized metadata tag, the second set of the one or more social media messages into a second specialized group within the generalized group. The processor may direct one or more users associated with the second set of social media messages to the second specialized group.

Following the example above, the user in Washington may be directed to a Washington fan group (e.g., a first specialized group) and another user from Alabama may be generated their own specialized metadata tag of "Alabama#1" and directed to an area of the social media website where Alabama fans are grouped together based on the "Alabama#1" tag. In some embodiments, any new users (or users with new messages/post) that include the generalized hashtag and are in the Alabama region may have their hashtags automatically replaced with "Alabama#1" and may be directed the "Alabama#1" group.

In some embodiments, the processor may identify, from the first set of social media messages, a first user who supplied a first message in the first set of social media messages. The first message may be identified from a temporal metadata tag. The processor may designate the first user as a mediator for the specialized group.

For example, Ed may post to a social media website the message: "Mudslide has closed Lincoln Road," at 7:30a.m. The social media website may determine from analyzing the message, that the severity of the message, e.g., a road closure due to a natural disaster, warrants its own specialized group and may determine that Ed should be the mediator/founder/moderator for the group as Ed was the first to discover the road closure. Thus, as other users react to the road closure, they can be directed towards Ed's group and can direct questions to Ed and/or others in the group. It may be beneficial for a social media source to have the automatic designation of a moderator in such an instance that the moderator/user is a part of a rescue team asking for search help after a natural disaster and/or if the moderator/user is a part of a small geographical community and information is more easily spread through the moderator than traditional media outlets.

In some embodiments, when directing one or more users associated with the first set of social media messages to the specialized group, the processor may generate an interactive prompt. The interactive prompt may request at user to accept the directing to the specialized group. The processor may display the user-interactive prompt to each of the one or more users.

For example, before a user is directed toward a specialized group, the social media forum that the user is using may display, on the user's computing device that is accessing the social media forum, a prompt that overtly asks the user for their permission to direct them to the specialized group. If the user agrees, then the user is directed to the specialized group. If the user disagrees, then the user will be directed to the generalized group and may see each of the one or more generalized messages in the generalized group with no way of knowing which messages most pertain to the user (e.g., they may see all messages related to all sports teams instead of just teams that they are interested in, they may see all fashion releases instead of only fashion releases from designers that they are interested in, etc.). In some embodiments, the generalized metadata tag associated with the messages/posts sent by the user(s) that did not accept the redirecting to the specialized group may retain their generalized metadata tag and may not be given a specialized metadata tag.

In some embodiments, the processor may identify that a number of the one or more users did not accept the directing to the specialized group. The processor may retain the number of the one or more users in the generalized group. The processor may display the first set of the one or more social media messages to the number of the one or more users before the rest of the one or more social media messages.

For example, the users that did not accept the redirect may be retained in the generalized group, but shown the messages with the specialized metadata tag that would have been shown to the user in the specialized group before any of the other messages present in the generalized group. This may allow the user to still more advantageously see the information/posts/messages/etc. that are most pertinent to them.

Figure 1:
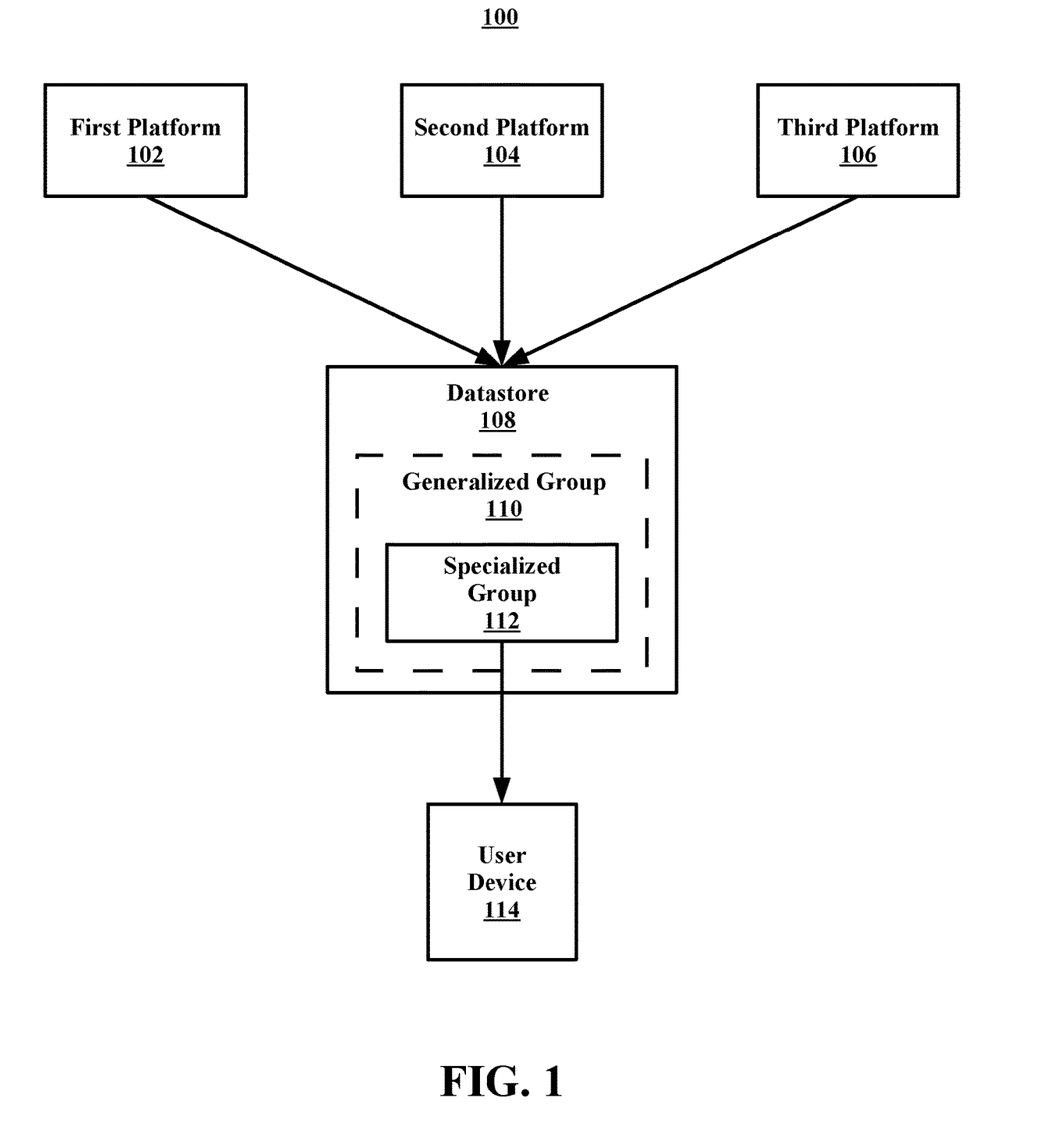
FIG. 1 illustrates an example system for directing a user to a specialized group, in accordance with embodiments of the present disclosure.

Referring now to FIG. 1, illustrated is an example system 100 for directing a user to a specialized group, in accordance with embodiments of the present disclosure. In some embodiments, the system 100 includes a first platform 102, a second platform 104, a third platform 106, a datastore 108, and a user device 114. In some embodiments, the datastore 108 includes storage of a generalized group 110. In some embodiments, the generalized group 110 is partitioned to include a specialized group 112.

In some embodiments, the first platform 102 receives 50 posts related to a certain topic (e.g., a sports star, a musician, natural disaster, etc.), the second platform 104 receives 50 posts related to the same topic, and the third platform receives 20 posts related to the same topic. In some embodiments, the system 100 utilizes a tool (e.g., third-party software, scrubbers, etc.) to analyze each platform 102, 104, and 106 to identify the certain topic.

The system 100, using the tool, stores the posts related to the certain topic in then generalized group 110 of the datastore 108 and, in some embodiments, the system 100 determines that the total number of posts (i.e., 120) in the generalized group 110 exceeds a topic threshold (e.g., 100). In some embodiments, the system 100 automatically determines the threshold so as to determine when a generalized group has gotten too large for a common user to easily scan the information in the generalized group. For instance, 100 posts may equal 50 pages of text and the common user of a social media site may be unwilling to read 50 pages of text to identify the topic they are looking for.

In some embodiments, the system 100 partitions a portion of the generalized group 112 and generates the specialized group 112. In some embodiments, the specialized group 112 is based off of geographical stamps of the posts and/or time stamps associated with the posts. For instance, the system 100 identifies that a majority of the total posts were posted in Canada and generates a specialized group for Canadian users who are posting about the certain topic. Or, the system 100 identifies that over the past five minutes there has been an influx of 20 posts about the certain topic, and the system 100 determines that the sudden influx of posts over time (e.g., 4 posts a minute) warrants the system to generate a specific group in response (e.g., a post over time threshold was met).

The specialized group 112 allows users who posted to the platforms 102, 104, and/or 106 and a new user or users who will post to the platforms 102, 104, and/or 106 to be directed, on the user device 114, to the specialized topic of the certain topic that they are posting about (e.g., the certain topic being #Football to the specialized topic of #GronkFootball for New Englander posters). In some embodiments, the system 100 generates more than one specialized group, e.g., a specialized group for each geographic region/location associated with the posting users.

In some embodiments, the system 100 identifies that no new posts have been entered by users for the certain topic in a threshold amount of time (e.g., 1 hour, 30 minutes, etc.) and the system 100 merges/de-partitions the specialized group 112 back into the generalized group 110, allowing new users to the certain topic and the original users to the certain topic access to each of posts related to the certain topic and not just the specialized topic generated by the system 100.

It is noted that the described invention helps alleviate user confusion and system overload related to regional variants of the same topic/categorical wording. That is, one general topic may be used by multiple users and each user may mean a different specific thing (e.g., football to an Alabamian means Alabama Football, whereas football to a Londoner means Manchester United soccer). The automatic partitioning and grouping of specialized/specific topics helps ease user confusion within a social media platform and helps the social media platform organize its content in a more meaningful fashion.

Figure 2:
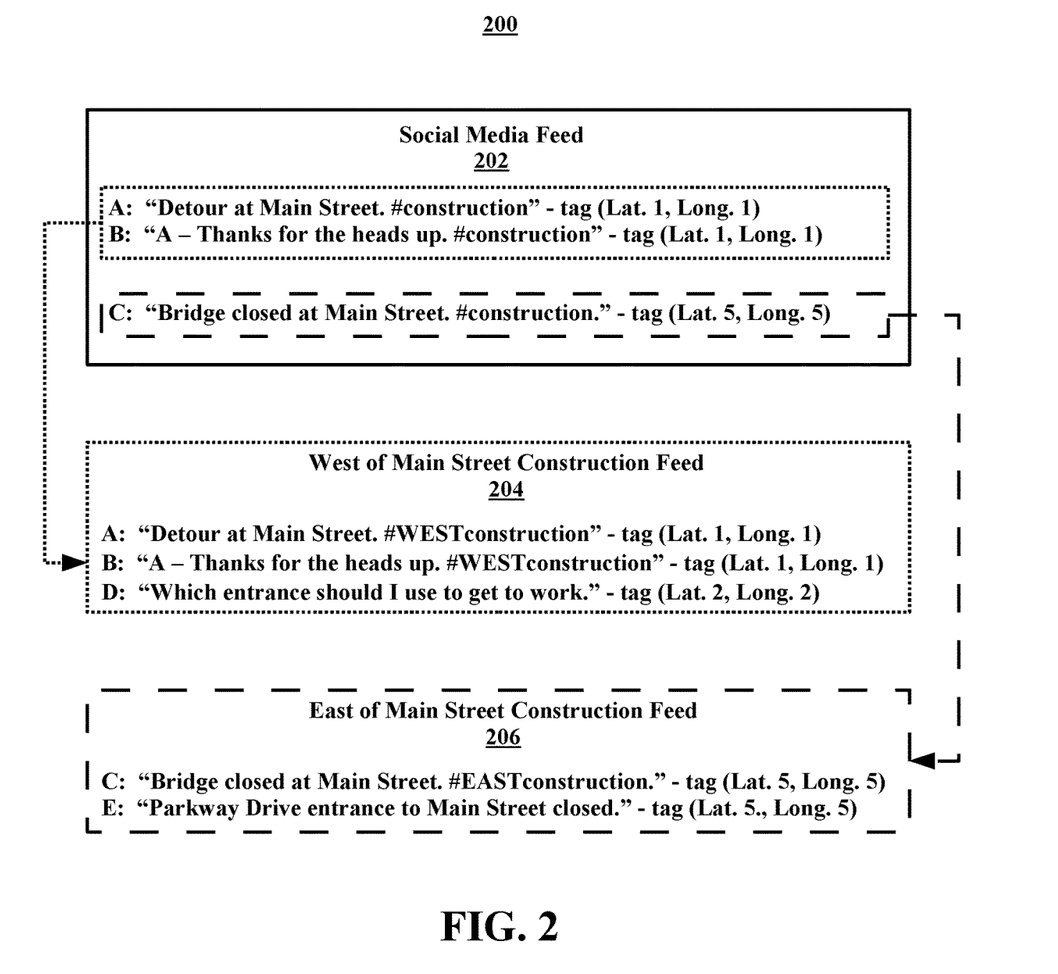
FIG. 2 illustrates an example social media platform specializing two similar topics, in accordance with embodiments of the present disclosure.

Referring now to FIG. 2, illustrated is an example social media platform 200 specializing two similar topics, in accordance with embodiments of the present disclosure. In some embodiments, the social media platform 200 includes a social media feed 202. In some embodiments, the social media platform 200 partitions the social media feed 202 into two specialized feeds: West of Main Street Construction Feed 204 (West Feed 204) and East of Main Street Construction Feed 206 (East Feed 206).

In some embodiments, a user A posts "Detour at Main Street. #construction" to the social media feed 202. In some embodiments, the category classifier "#construction" may be manually input by the user A or may be automatically generated and tagged to the post by the social media platform 200 (or system being utilized by the social media platform 200) using natural language processing techniques. The natural language processing techniques identify that "detour" is most commonly used in instances involving traffic issues caused by construction.

In some embodiments, the social media platform 200 tags user A's post with a geo-stamp of user A's location at the time the post was posted to the social media feed 202. In some embodiments, the social media platform 200 has access to user A's location by being allowed to access user A's location through user A's electronic device that is being used to post the message to the social media feed 202.

In some embodiments, a user B posts "(user) A—Thanks for the heads up. #construction" to the social media feed 202. In some embodiments, the category classifier may be input/generated as described above in relation to user A's post. In some embodiments, the social media platform 200 (or system, as described above in relation to user A's post) may tag user B's post with a geo-stamp of user B's location at the time the post was posted to the social media feed 202.

In some embodiments, a user C posts "Bridge closed at Main Street. #construction" to the social media feed 202. In some embodiments, the category classifier may be input/generated as described above in relation to user A's post. In some embodiments, the social media platform 200 (or system, as described above in relation to user A's post) may tag user C's post with a geo-stamp of user C's location at the time the post was posted to the social media feed 202.

In some embodiments, the social media platform 200 identifies from the geo-stamps of each user's posts that user A and user B are discussing the same construction event, as they are in the same or relatively same geographical location, and that user C is discussing a different construction event, as they are in a difference geographical location than users A and B. It is noted that the construction event could be the same construction event, but causing a different experience for user's based on the user's relative location (e.g., traffic is down to one lane for westbound travelers, but traffic is not moving for eastbound travelers, etc.).

In some embodiments, the social media platform 200 generates a new specialized category classifier (e.g., tag) for user A's and B's post that is associated with user A's and B's location (e.g., "#WESTconstruction"); and the social media platform 200 generates a new specialized category classifier for user C that is associate with user C's location (e.g., "EASTconstruction"). In some embodiments, the social media platform 200 partitions the social media feed 202 into two specialized feeds (e.g., groups) 204 and 206, based on the specialized category classifiers. For ease of visualization, it is noted that the two specialized feeds 204 and 206 are depicted as separate entities from the social media feed 202, but the feeds 204 and 206 can be partitioned groups within the social media feed 202 itself.

In some embodiments, the social media platform 200 directs user A's and B's posts to the partitioned area of the West Feed 204, and now each user west of the construction can interact in the West Feed 204, which may be more helpful for each Western user than perhaps interacting with a user dealing with another/different construction issue in the East. In some embodiments, a new user, user D, has noticed on their news feed that there is a construction issue and posts "Which entrance should I use to get to work," and the social media platform 200 identifies that the geo-stamp of user D is in the relative location (or is nearest) to the users West of the construction issue in the area. The social media platform 200 directs user D to the West Feed 204 to interact with other users (e.g., users A and B) that are west of the construction, as they may have an answer to user D's post/question. In some embodiments, the social media platform 200, after generating the initial specialized category classifiers/tags and the specialized feed(s) may direct new posts to the specialized feed(s) solely based on the posts' geo-stamp and forgo tagging the new posts with the specialized category classifier.

In some embodiments, much like which was discussed above, the social media platform 200 directs user C's post to the partitioned area of the East Feed 206 and now each (new) user east of the construction can interact in the East Feed 206, which may be more helpful for each Eastern user than interacting with a user dealing with another/different construction issue in the West. In some embodiments, a new user, user E, has noticed on their news feed that there is a construction issue and posts "Parkway Drive entrance to Main Street closed," and the social media platform 200 identifies that the geo-stamp of user E is in the relative location (or is nearest) to the user(s) east of the construction issue in the area. The social media platform 200 directs user E to the East Feed 206 to interact with other users (e.g., user A and other new Eastern users) that are east of the construction, as they may most benefit from user E's post. In some embodiments, the social media platform 200 may identify from user E's post that the Parkway Drive entrance to Main Street is an Eastbound only exit and therefore determine to place user E's post in the East Feed 206.

In some embodiments, after not receiving anymore #construction related posted for a period of time (e.g., 1 hour, 8 hours, a day, etc.), the social media platform 200 departitions the social media feed 202 and merges the West Feed 204 and the East Feed 206 back into the social media feed 202. In other embodiments, the social media platform 200 could identify that new related category classifier (generalized tag), such as "#mainstreetconstructiondone (as posted by the local municipality, etc.) has been posted and the social media platform 200 may determine that it is now unnecessary for the separate West Feed 204 and East Feed 206. The social media platform 200 then merges the West Feed 204 and the East Feed 206 back into the social media feed 202.

Figure 3:
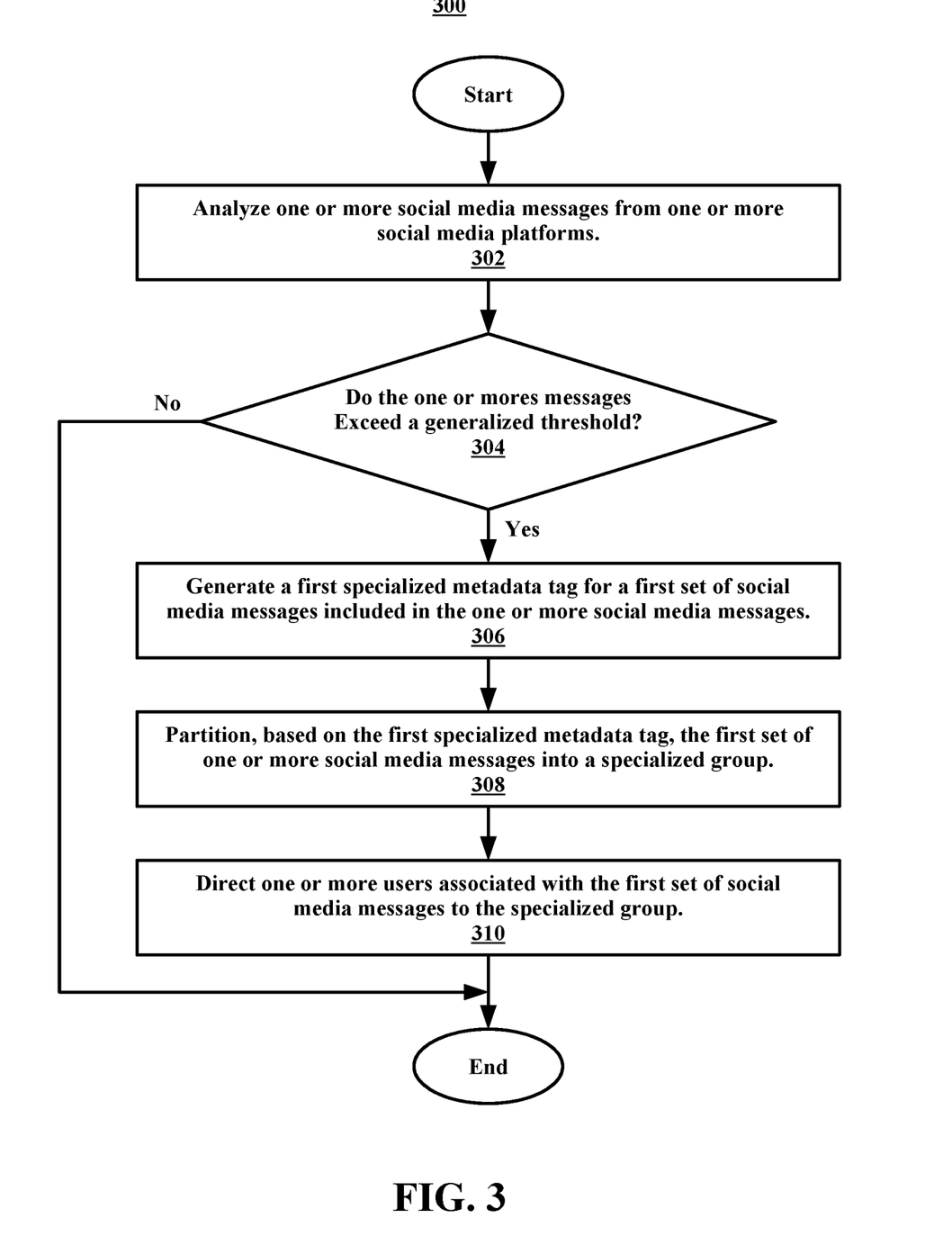
FIG. 3 illustrates a flowchart of an example method for directing one or more users associated with a first set of social media messages to a specialized group, in accordance with embodiments of the present disclosure.

Referring now to FIG. 3, illustrated is a flowchart of an example method 300 for directing one or more users associated with a first set of social media messages to a specialized group, in accordance with embodiments of the present disclosure. In some embodiments, the method 300 may be performed by a processor and/or a processor utilized by/in a (social media) system. In some embodiments, the method 300 begins at operation 302.

At operation 302, a processor analyzes one or more social media messages from one or more social media platforms. Each of the one or more social media messages includes a generalized metadata tag (e.g., category classifiers, etc.) and the one or more social media messages are categorized, by the processor, as a generalized group (based on the generalized metadata tag).

In some embodiments, the method 300 proceeds to decision block 304 where it is determined if the one or more messages (as the generalized group) exceed a generalized threshold. If, at decision block 304, the one or more messages do not exceed a generalized threshold, the method 300 ends. If, at decision block 304, the one or more messages do exceed a generalized threshold, the method 300 proceeds to operation 306.

At operation 306, the processor generates a first specialized metadata tag for a first set of social media messages included in the one or more social media messages. In some embodiments, the method 300 proceeds to operation 308, where the processor partitions, based on the first specialized metadata tag, the first set of the one or more social media messages into a specialized group within the generalized group.

In some embodiments, the method 300 proceeds to operation 310. At operation 310, the processor directs one or more users associated with the first set of social media messages to the specialized group. In some embodiments, the method 300 ends.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
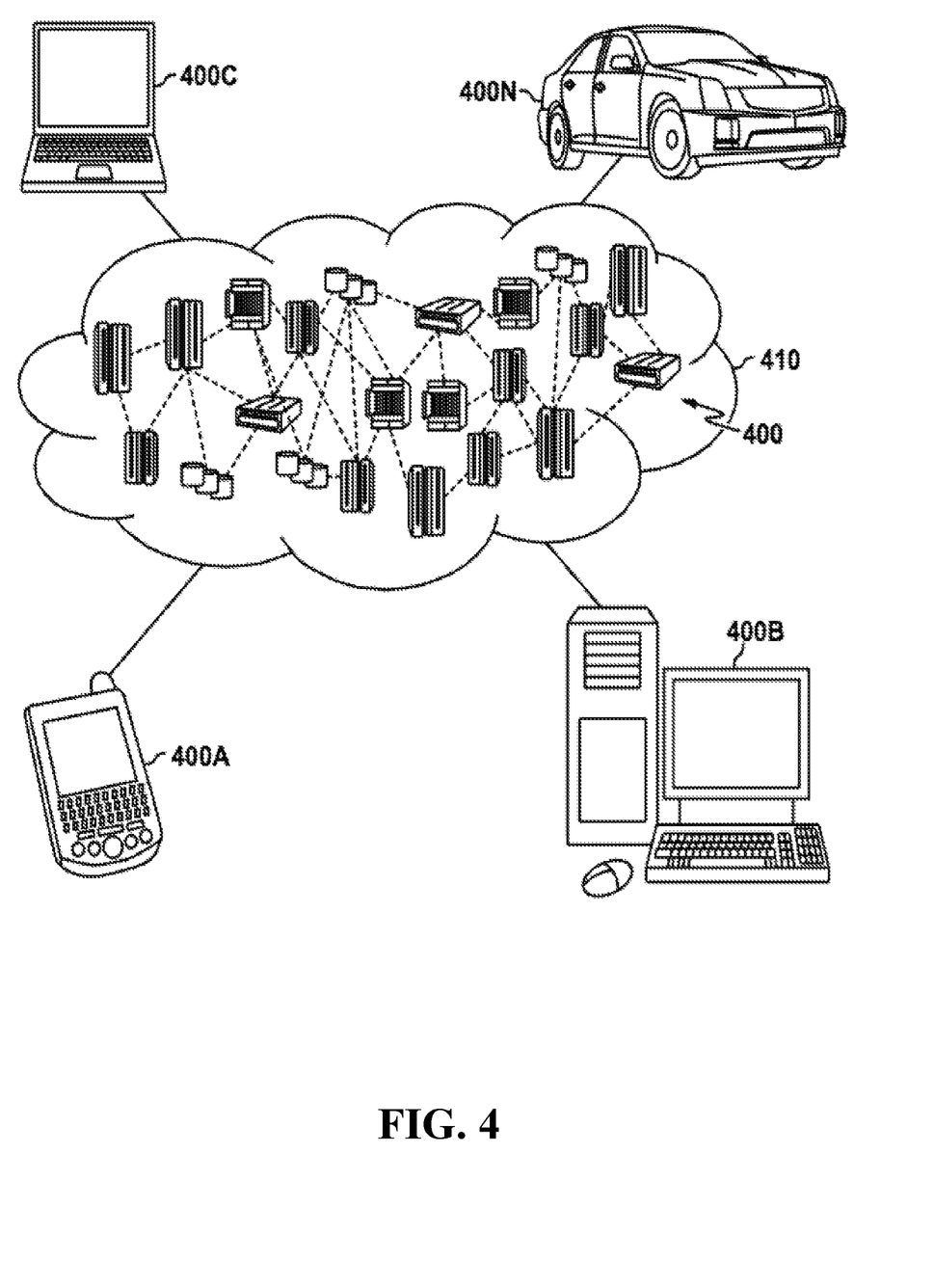
FIG. 4 depicts a cloud computing environment, in accordance with embodiments of the present disclosure.

Referring now to FIG. 4, illustrative cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof.

This allows cloud computing environment 410 to offer infrastructure, platforms and/or software as services for which a cloud consumer does not need to maintain resources on a local computing device. It is understood that the types of computing devices 400A-N shown in FIG. 4 are intended to be illustrative only and that computing nodes 400 and cloud computing environment 410 can communicate with any type of computerized device over any type of network and/or network addressable connection (e.g., using a web browser).

Figure 5:
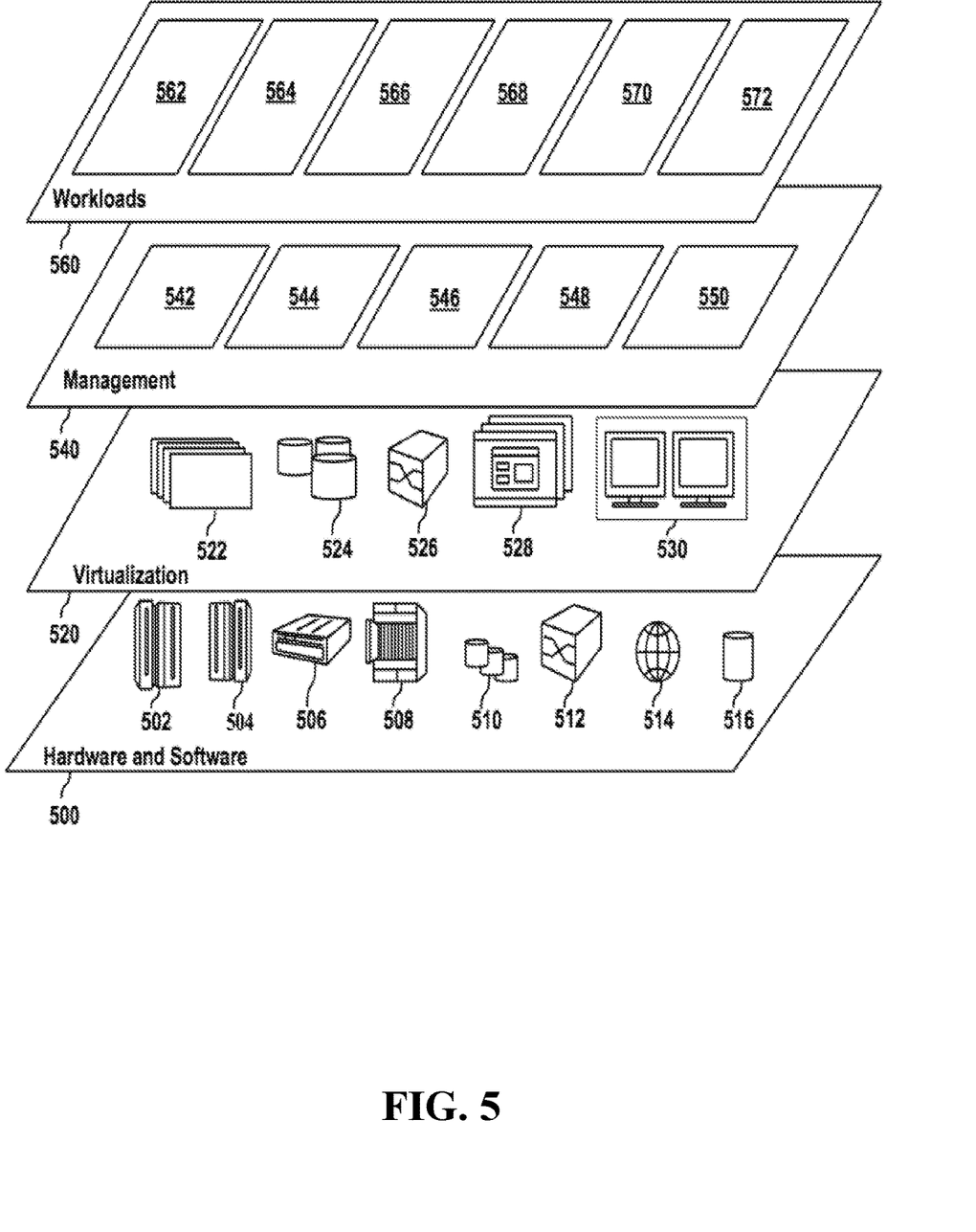
FIG. 5 depicts abstraction model layers, in accordance with embodiments of the present disclosure.

Referring now to FIG. 5, a set of functional abstraction layers provided by cloud computing environment 410 (FIG. 4) is shown. It should be understood in advance that the components, layers, and functions shown in FIG. 5 are intended to be illustrative only and embodiments of the disclosure are not limited thereto. As depicted below, the following layers and corresponding functions are provided.

Hardware and software layer 500 includes hardware and software components. Examples of hardware components include: mainframes 502; RISC (Reduced Instruction Set Computer) architecture based servers 504; servers 506; blade servers 508; storage devices 510; and networks and networking components 512. In some embodiments, software components include network application server software 514 and database software 516.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 540 may provide the functions described below. Resource provisioning 542 provides dynamic procurement of computing resources and other resources that are utilized to perform tasks within the cloud computing environment. Metering and Pricing 544 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 546 provides access to the cloud computing environment for consumers and system administrators. Service level management 548 provides cloud computing resource allocation and management such that required service levels are met. Service Level Agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment may be utilized. Examples of workloads and functions which may be provided from this layer include: mapping and navigation 562; software development and lifecycle management 564; virtual classroom education delivery 566; data analytics processing 568; transaction processing 570; and I/O throttling 572.

Figure 6:
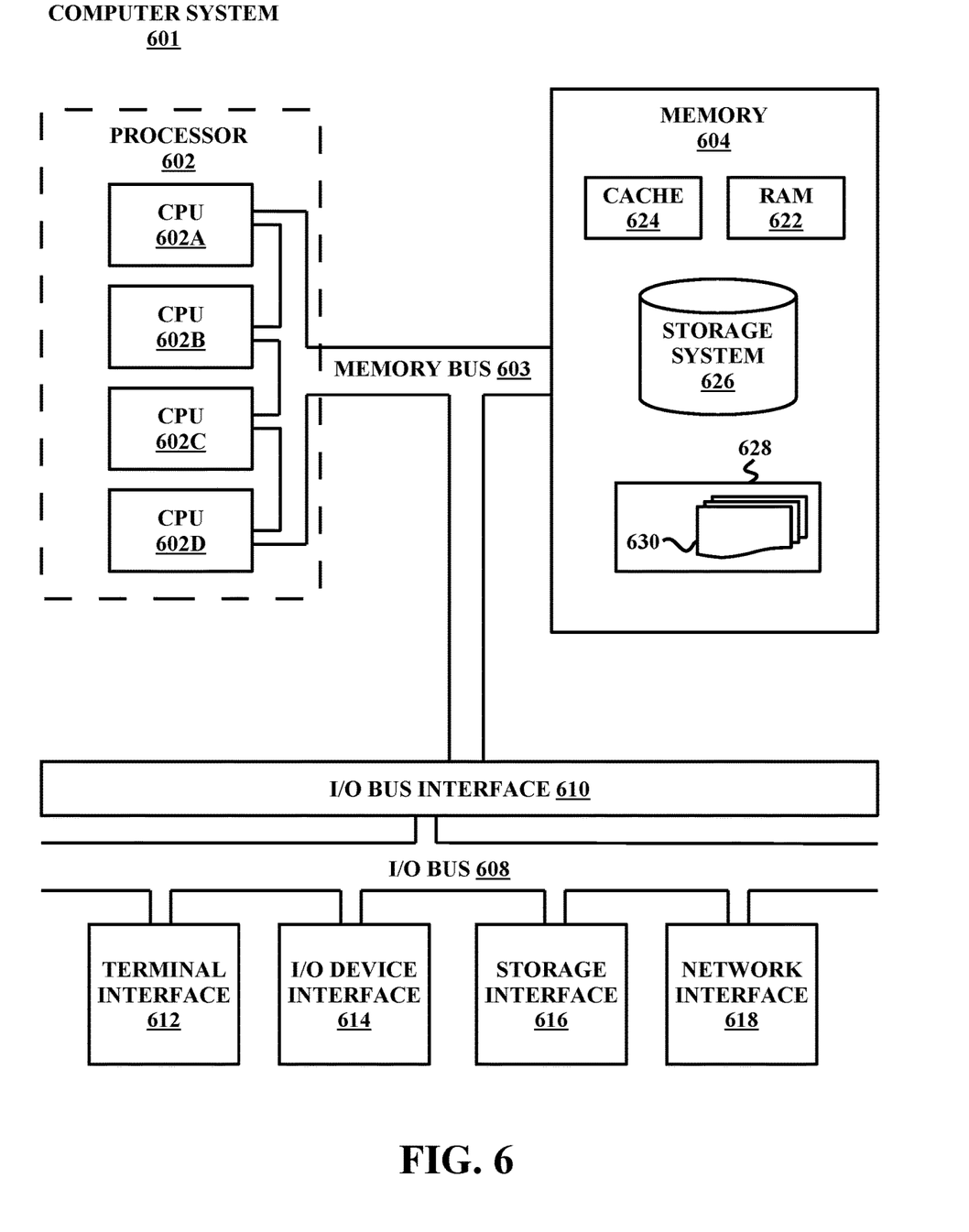
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 601 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smartphone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
    analyzing, by a processor, one or more social media messages from one or more social media platforms, wherein each of the one or more social media messages includes a generalized metadata tag, and wherein the one or more social media messages are categorized as a generalized group;
    determining, from the generalized group, that the one or more social media messages exceeds a generalized threshold;
    generating a first specialized metadata tag for a first set of social media messages included in the one or more social media messages;
    partitioning, based on the first specialized metadata tag, the first set of the one or more social media messages into a specialized group within the generalized group;
    directing one or more users associated with the first set of social media messages to the specialized group;
    identifying, from the first set of social media messages, a first user who supplied a first message in the first set of social media messages, wherein the first message is identified from a temporal metadata tag; and
    designating the first user as a mediator for the specialized group.

2. The method of claim 1, wherein the first specialized metadata tag is associated with a geographical location, and wherein the method further comprises:
    replacing the generalized metadata tag of the first set of social media messages with the first specialized metadata tag; and
    displaying the first set of social media messages to the one or more users in the geographical location.

3. The method of claim 2, further comprising:
    identifying that a retention threshold of new social media messages including the generalized metadata tag has not been met within a specified time; and
    merging the specialized group back into the generalized group.

4. The method of claim 2, further comprising:
    generating a second specialized metadata tag for a second set of social media messages included in the one or more social media messages, wherein the second specialized metadata tag is associated with a second geographical location;
    partitioning, based on the second specialized metadata tag, the second set of the one or more social media messages into a second specialized group within the generalized group; and
    directing one or more users associated with the second set of social media messages to the second specialized group.

5. The method of claim 1, wherein directing one or more users associated with the first set of social media messages to the specialized group comprises:
    generating an interactive prompt, wherein the interactive prompt requests a user to accept the directing to the specialized group; and
    displaying the interactive prompt to each of the one or more users.

6. The method of claim 5, further comprising:
    identifying that a number of the one or more users did not accept the directing to the specialized group;
    retaining the number of the one or more users in the generalized group; and
    displaying the first set of social media messages to the number of the one or more users before the rest of the one or more social media messages.

7. A system comprising:
    a memory; and
    a processor in communication with the memory, the processor being configured to perform operations comprising:
    analyzing one or more social media messages from one or more social media platforms, wherein each of the one or more social media messages includes a generalized metadata tag, and wherein the one or more social media messages are categorized as a generalized group;
    determining, from the generalized group, that the one or more social media messages exceeds a generalized threshold;
    generating a first specialized metadata tag for a first set of social media messages included in the one or more social media messages;
    partitioning, based on the first specialized metadata tag, the first set of the one or more social media messages into a specialized group within the generalized group;
    directing one or more users associated with the first set of social media messages to the specialized group;
    identifying, from the first set of social media messages, a first user who supplied a first message in the first set of social media messages, wherein the first message is identified from a temporal metadata tag; and
    designating the first user as a mediator for the specialized group.

8. The system of claim 7, wherein the first specialized metadata tag is associated with a geographical location, and wherein the operations further comprise:
    replacing the generalized metadata tag of the first set of social media messages with the first specialized metadata tag; and
    displaying the first set of social media messages to the one or more users in the geographical location.

9. The system of claim 8, wherein the operations further comprise:
    identifying that a retention threshold of new social media messages including the generalized metadata tag has not been met within a specified time; and
    merging the specialized group back into the generalized group.

10. The system of claim 8, wherein the operations further comprise:
    generating a second specialized metadata tag for a second set of social media messages included in the one or more social media messages, wherein the second specialized metadata tag is associated with a second geographical location;

partitioning, based on the second specialized metadata tag, the second set of the one or more social media messages into a second specialized group within the generalized group; and directing one or more users associated with the second set of social media messages to the second specialized group.

11. The system of claim 7, wherein directing one or more users associated with the first set of social media messages to the specialized group comprises:

generating an interactive prompt, wherein the interactive prompt requests a user to accept the directing to the specialized group; and displaying the interactive prompt to each of the one or more users.

12. The system of claim 11, wherein the operations further comprise:

identifying that a number of the one or more users did not accept the directing to the specialized group;

retaining the number of the one or more users in the generalized group; and displaying the first set of social media messages to the number of the one or more users before the rest of the one or more social media messages.

13. A computer program product comprising a computer readable storage medium having program instructions embodied therewith, the program instructions executable by a processor to cause the processor to perform a method, the method comprising:

analyzing, by a processor, one or more social media messages from one or more social media platforms, wherein each of the one or more social media messages includes a generalized metadata tag, and wherein the one or more social media messages are categorized as a generalized group;

determining, from the generalized group, that the one or more social media messages exceeds a generalized threshold;

generating a first specialized metadata tag for a first set of social media messages included in the one or more social media messages;

partitioning, based on the first specialized metadata tag, the first set of the one or more social media messages into a specialized group within the generalized group;

directing one or more users associated with the first set of social media messages to the specialized group;

identifying, from the first set of social media messages, a first user who supplied a first message in the first set of social media messages, wherein the first message is identified from a temporal metadata tag; and designating the first user as a mediator for the specialized group.

14. The computer program product of claim 13, wherein the first specialized metadata tag is associated with a geographical location, and wherein the method further comprises:

replacing the generalized metadata tag of the first set of social media messages with the first specialized metadata tag; and displaying the first set of social media messages to the one or more users in the geographical location.

15. The computer program product of claim 14, wherein the method further comprises:

identifying that a retention threshold of new social media messages including the generalized metadata tag has not been met within a specified time; and merging the specialized group back into the generalized group.

16. The computer program product of claim 14, wherein the method further comprises:

generating a second specialized metadata tag for a second set of social media messages included in the one or more social media messages, wherein the second specialized metadata tag is associated with a second geographical location;

partitioning, based on the second specialized metadata tag, the second set of the one or more social media messages into a second specialized group within the generalized group; and directing one or more users associated with the second set of social media messages to the second specialized group.

17. The computer program product of claim 13, wherein directing one or more users associated with the first set of social media messages to the specialized group comprises:

generating an interactive prompt, wherein the interactive prompt requests a user to accept the directing to the specialized group; and displaying the interactive prompt to each of the one or more users.

* * * * *